(12) United States Patent
Ting et al.

(10) Patent No.: US 6,810,155 B1
(45) Date of Patent: Oct. 26, 2004

(54) METHOD AND APPARATUS FOR SCALING AN IMAGE WITH LOCALLY SELECTED INTERPOLATION FUNCTIONS

(75) Inventors: Hou-Chun Ting, Chang-Hua (TW); Chun-Hung Chen, Hsinchu (TW); Shu-Lin Fan-Chiang, Toa-Yuan (TW); Meng-Hsui Wei, Hsinchu (TW)

(73) Assignee: Macronix International Co., Ltd., Hsinchu (TW)

(*) Notice: Subject to any disclaimer, the term of this patent is extended or adjusted under 35 U.S.C. 154(b) by 0 days.

(21) Appl. No.: 09/367,532
(22) PCT Filed: Jan. 8, 1999
(86) PCT No.: PCT/US99/00500

§ 371 (c)(1),
(2), (4) Date: Aug. 16, 1999

(87) PCT Pub. No.: WO00/41386

PCT Pub. Date: Jul. 13, 2000

(51) Int. Cl.⁷ .................................................. G06K 9/32
(52) U.S. Cl. .................... 382/300; 382/218; 358/528
(58) Field of Search .............................. 382/298–300, 382/276, 239, 354, 173, 176, 218, 261, 238; 358/1.2, 1.9, 525, 528, 532, 447, 445, 451–452, 448, 3.07, 2.1, 428, 442; 345/581, 442, 606–610, 98; 399/32

(56) References Cited

U.S. PATENT DOCUMENTS

| | | | |
|---|---|---|---|
| 5,018,024 A | 5/1991 | Tanioka | 358/2.1 |
| 5,287,092 A | 2/1994 | Shiraishi | 345/98 |
| 5,345,317 A | 9/1994 | Katsuno et al. | 382/239 |
| 5,553,201 A | 9/1996 | Muramatsu | 358/1.9 |
| 5,587,772 A | 12/1996 | Arai et al. | 399/32 |
| 5,636,339 A | 6/1997 | Huang et al. | 345/442 |
| 5,701,367 A | 12/1997 | Koshi et al. | 382/239 |
| 5,760,921 A | 6/1998 | Miyake | 358/3.07 |
| 5,875,268 A | 2/1999 | Miyake | 382/276 |
| 5,889,894 A | 3/1999 | Ito et al. | 382/300 |
| 5,953,465 A * | 9/1999 | Saotome | 382/300 |
| 6,157,749 A * | 12/2000 | Miyake | 382/300 |
| 6,611,632 B1 * | 8/2003 | Tomiyama et al. | 382/300 |

OTHER PUBLICATIONS

"Interpolation and Decimation of Digital Signals—A Tutorial Review," Ronald E. Crochiere and Lawrence R. Rabiner, *Proceedings of the IEEE*, vol. 69, No. 3, Mar. 1981, pp. 300–331.

"Edge Preserving Interpolation of Digital Images Using Fuzzy Interference," Hou–Chun Ting and Hsueh–Ming Hang, *Journal of Visual Communication and Image Representation*, vol. 8, No. 4, Dec. 1997, pp. 338–355.

\* cited by examiner

Primary Examiner—Leo Boudreau
Assistant Examiner—Ishrat Sherali
(74) Attorney, Agent, or Firm—Mark A. Haynes; Haynes Beffel & Wolfeld LLP

(57) ABSTRACT

An apparatus for scaling an image composed of pixels by a scale factor is described. The apparatus includes a local image analyzer for identifying from among said pixels a target pixel and a set of pixels proximate to said target pixel and determining a type for the target pixel. The apparatus includes a linear interpolation function that is parameterized by a horizontal linear interpolation coefficient and a vertical linear interpolation coefficient. The apparatus includes an interpolation coefficient generator for defining the horizontal and vertical linear interpolation coefficients. The apparatus includes an image scaler for scaling said image in a neighborhood of the target pixel by the scale factor using the linear interpolation function with the horizontal linear interpolation coefficient and the vertical linear interpolation coefficient. A method of scaling a source image. The source image comprised of a first plurality of pixels, by a scale factor said method for scaling comprising the acts of: determining a first type of a target pixel, said target pixel in said plurality of pixels; selecting a first interpolation function for said target pixel from said first type of said target pixel; and scaling said source image using said first interpolation function for scaling said target pixel.

20 Claims, 7 Drawing Sheets

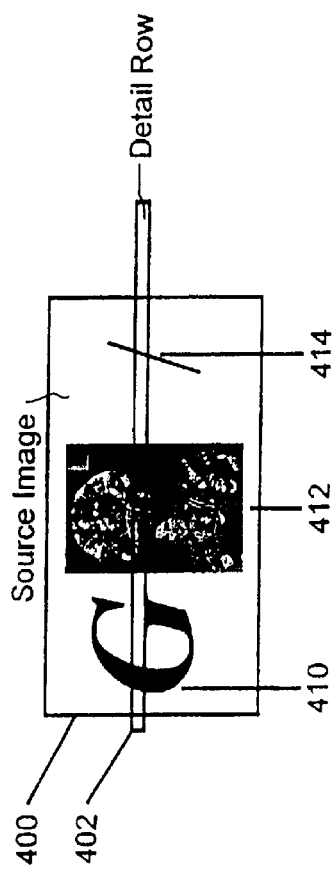
Fig. 4
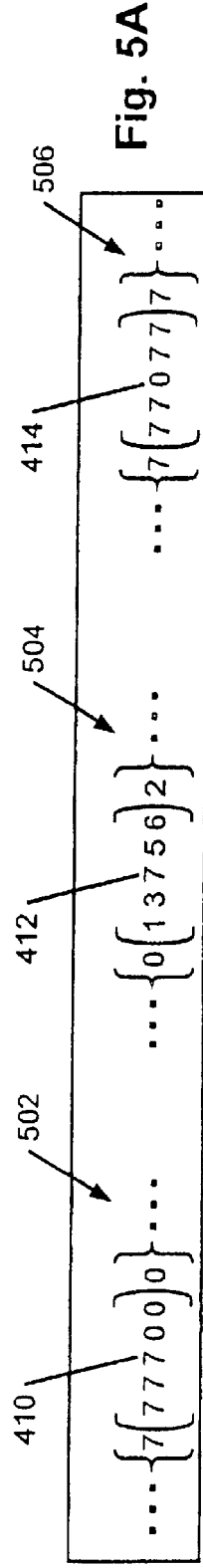
Fig. 5A
Fig. 5B
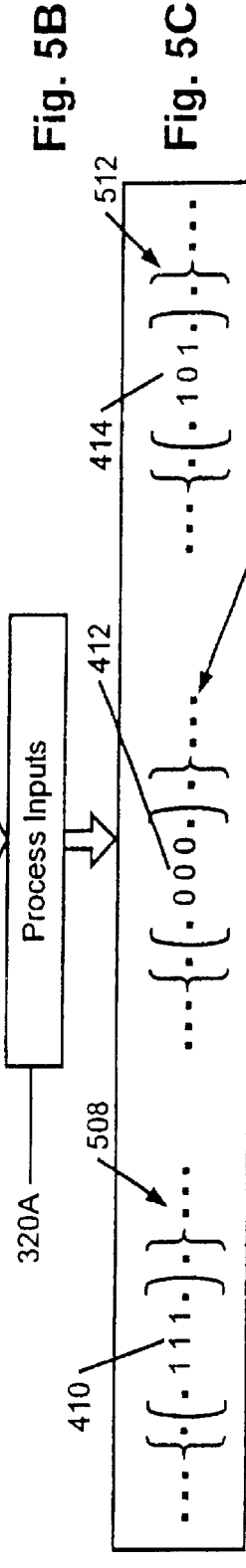
Fig. 5C
Fig. 5D
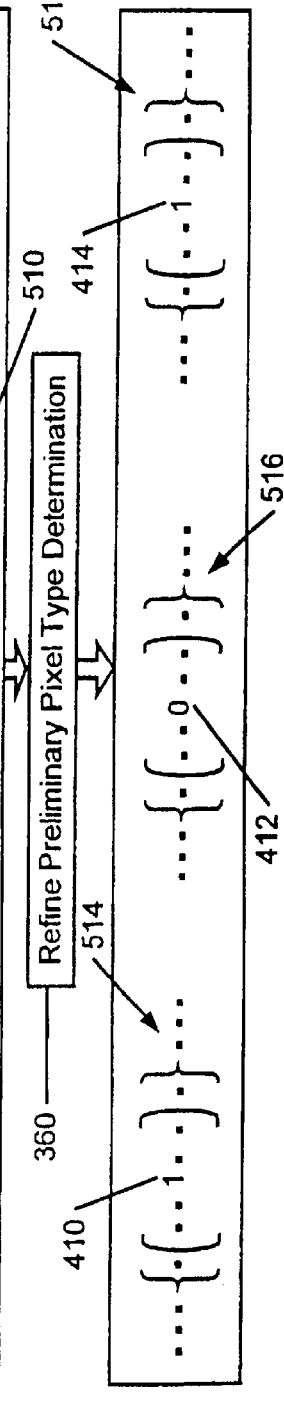
Fig. 5E

METHOD AND APPARATUS FOR SCALING AN IMAGE WITH LOCALLY SELECTED INTERPOLATION FUNCTIONS

BACKGROUND OF THE INVENTION

1. Field of the Invention

This invention relates to the field of digital image interpolation and more specifically relates to improved methods of detecting the type of image being interpolated on a pixel by pixel basis to better select interpolation functions.

2. Description of the Related Art

Images are typically provided at a single size and need to be scaled either up or down for a variety of uses. Image scaling is done in diverse fields such as video production and editing, multimedia content creation, desktop publishing, photography, and photocopying. It is important that the scaled image be a faithful interpretation of the original image. It can not be an exact duplicate because in the process of scaling an image up, interpolating, additional information must be generated, or filled in, to create the enlarged image. Similarly, when scaling an image down, decimating, it is necessary to eliminate some information to create the reduced image.

Interpolation functions are functions that can be used to generate the interpolated, or decimated, images. However, these interpolation functions tend to cause either blurring or aliasing of a digital image that is being interpolated. Aliasing is the creation of jagged edges. In images that are composed primarily of text, computer line graphics and other images with hard edges, it is important to select an interpolation function that preserves the edges and avoids blurring the image. Similarly, in images that are composed primarily of graphics, natural images, scanner input, and other images which lack hard edges, it is important to select an interpolation function that will avoid creating jagged edges and instead tends to blur the image slightly.

Mr. Muyramatsu teaches, in U.S. Pat. No. 5,553,201, that it may be desirable to use a less computationally expensive interpolation function for images being interpolated by a small :scale factors and a more computationally expensive interpolation function for images being interpolated by a large scale factors. A drawback of this approach is that it is not responsive to image type but rather to the amount of scaling being done.

Mr. Tanioka teaches in U.S. Pat. No. 5,018,024, that it may be desirable to compute the number of color transitions in a square block of pixels to select a dithering process for an image. A drawback of this approach is that it is computationally intensive and not capable of responding to localized changes in image type.

Accordingly, what is needed is a method for identifying pixel types for interpolation that is computationally simple and that can be used to select the most appropriate interpolation functions for an image on a pixel by pixel basis.

SUMMARY OF THE INVENTION

A method of scaling a source image is described. The source image has a plurality of pixels and the source image is being scaled by a scale factor. One of the pixels in the source image is selected as a target pixel. A type is determined for that target pixel. Based on the type of the target pixel, an interpolation function is selected and the source image is scaled using the selected interpolation function to scale the target pixel.

Determining the type of the target pixel includes examining a neighborhood of pixels surrounding the target pixel and determining whether the target pixel is similar to that neighborhood. If the target pixel is similar to the neighborhood of pixels, the pixel is categorized as an artificial type image. If the pixel is dissimilar to the neighborhood of pixels it is categorized as a natural image type.

An apparatus for scaling an image composed of pixels by a scale factor is described. The apparatus includes a local image analyzer for identifying from among said pixels a target pixel and a set of pixels proximate to said target pixel and determining a type for the target pixel. The apparatus includes a linear interpolation function that is parameterized by a horizontal linear interpolation coefficient and a vertical linear interpolation coefficient. The apparatus includes an interpolation coefficient generator for defining the horizontal and vertical linear interpolation coefficients. The apparatus includes an image scaler for scaling said image in a neighborhood of the target pixel by the scale factor using the linear interpolation function with the horizontal linear interpolation coefficient and the vertical linear interpolation coefficient.

BRIEF DESCRIPTION OF THE FIGURES

FIG. 4 illustrates a source image similar to that shown in FIG. 1.

FIGS. 5A–E show different stages of processing a row of data in the logic circuit of FIG. 3.

DETAILED DESCRIPTION

A. Overview

Figure 1:
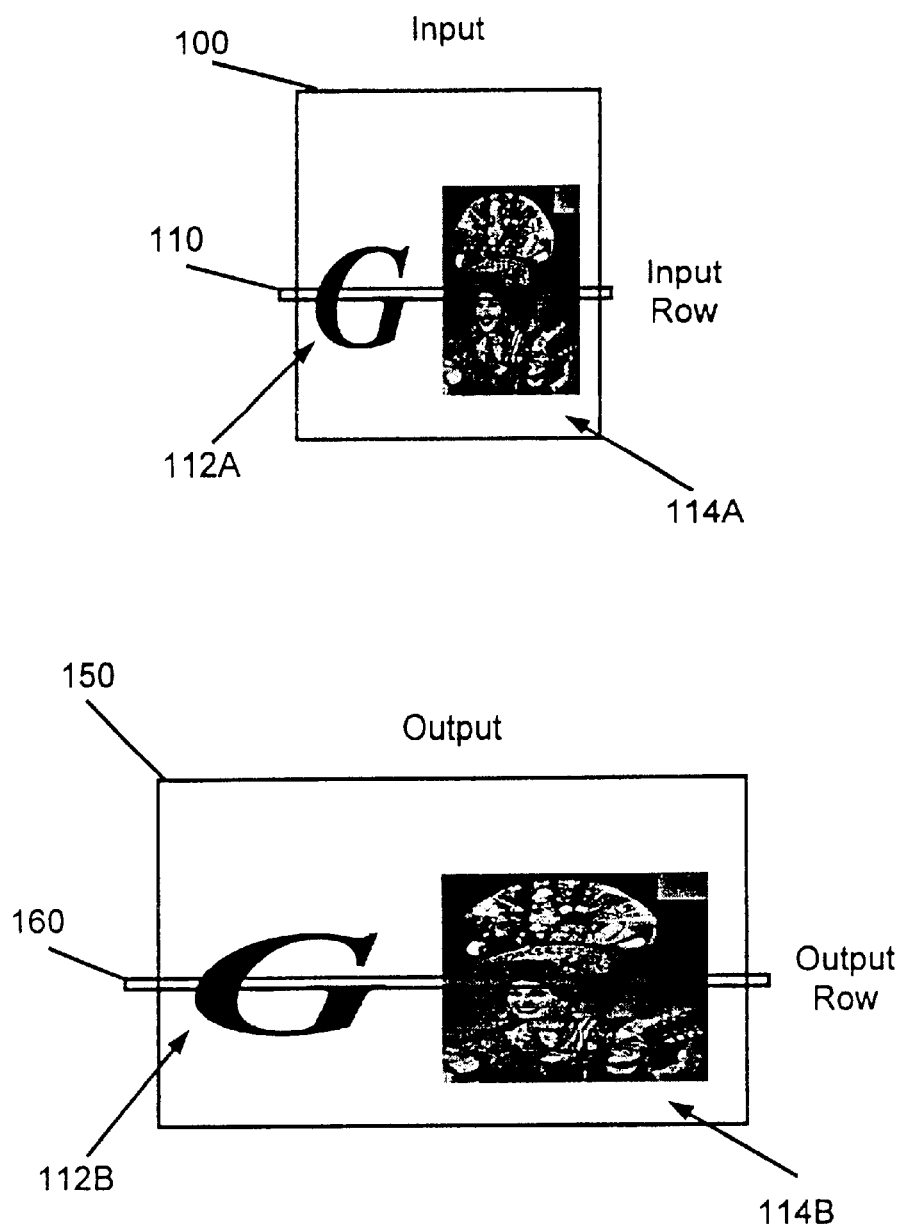
FIG. 1 illustrates an image being interpolated by the present invention.

A first type of image is an artificial image. Examples of artificial images include computer text and computer generated graphics. Because this type of image is computer created, for any pixel in an artificial image, there are generally neighboring pixels with the same pixel value or color. A second type of image is a natural image. Examples of natural images include scanned images and images captured using a digital camera. Natural images have atmospheric and electronic noise; therefore, for any pixel in a natural image, it is hard to find neighboring pixels with the same pixel value, or color. In order to produce the best results, the interpolation function should be selected based on the type of image being interpolated.

Because a single image can consist of both artificial and natural images interspersed together, the present invention teaches a method and apparatus for determining pixel type on a pixel by pixel basis. Different interpolation functions can then be applied to scale each pixel of the image based on the pixel type.

Furthermore, it is desirable for the interpolation function to be adjusted based on the scaling factor. This is especially true when artificial images are being interpolated. This is to find a balance between two factors: intensity variation and instantaneous contrast. Take for example an image composed of equal width vertical stripes. If the image is being interpolated by a non-integer scale factor, each stripe can not have equal width in the resulting image. Either the intensity variation or the contrast will be sacrificed depending on the interpolation function. If nearest neighbor interpolation is used, contrast will be preserved, but intensity variation will be high. However, smoother interpolation functions will have less intensity variation as well as less contrast. Depending on the scaling factor, the resulting image will be more or less aesthetically tolerable. For small scaling factors, the lower contrast is typically acceptable, for larger scaling factors, higher contrast is more desirable.

Consequently, it is helpful to design an adjustable interpolation function for artificial images that can vary with the scaling factors. Equation 1 is a formula for the value of the resulting pixel $q(m+\Delta_m, n+\Delta_n)$ derived by linear interpolation of a source pixel $p(m,n)$ with a linear interpolation coefficient of $a_i$ in the horizontal direction and $b_j$ in the vertical direction.

$$q(m+\Delta_m, n+\Delta_n) = \sum_{j=0}^{1} b_j \sum_{i=0}^{1} a_i \cdot p(m+i, n+j) \quad 0 \leq \Delta_m, \Delta_n \leq 1 \quad (1)$$

This can be further refined by limiting the linear interpolation coefficients as shown by Equation 2.

$$\sum_{i=0}^{1} a_i = \sum_{j=0}^{1} b_j = 1 \quad (2)$$

Despite these limitations on the interpolation function, adjustments can be made by making the linear interpolation coefficients dependent on $\Delta_m$ and $\Delta_n$. Considering only the horizontal coefficient, $a_i$ which depends on $\Delta_m$, the bilinear interpolation is given by using the linear interpolation coefficients shown by Equation 3.

$$a_0 = \begin{cases} 1 - \lambda \Delta_m^2 & \text{for } \Delta_m \leq 0.5 \\ \lambda \Delta_m^2 & \text{otherwise} \end{cases} \quad (4)$$
$$a_1 = 1 - a_0$$

A class of parameterized interpolation functions can be generated using these basic formulae and the linear interpolation coefficients shown by Equation 4, in which the type of edge weighting (EW) in this example is determined by the coefficient $\lambda$.

$$a_0 = 1 - \Delta_m \quad (3)$$
$$a_1 = 1 - a_0$$

The linear interpolation coefficients must both be positive and less than one, accordingly, $\lambda$ will range from 0 to 2. Two members of this class are EW1, $\lambda=1$, and EW2, $\lambda=2$.

The performance of the $\lambda$-parameterized interpolation functions in terms of intensity variation and instantaneous contrast can then be considered. The intensity variation, V, for a scale factor s, can be approximated by the polynomial shown in Equation 5.

$$\hat{V}_\lambda(s) = \frac{1}{s}(0.054\lambda^2 - 0.23\lambda + 0.25) \quad (5)$$

The imaging system designer will select an acceptable level of variation and the interpolation function can be selected from the class of interpolation functions by computing $\lambda$ from the scale factor and the acceptable variation level.

The instantaneous contrast C, for a scale factor s, can be approximated by Equation 6.

$$\hat{C}_\lambda(s) = 1 - 0.5\lambda^{-\frac{2.1}{s}} \quad (6)$$

The imaging system designer will select an acceptable level of instantaneous contrast and the interpolation function can be selected from the class of interpolation functions by computing $\lambda$ from the scale factor and the acceptable contrast level.

Typically, the variation level is more important for image appearance than the instantaneous contrast when the scaling factor is less than a certain value, for example 2.0. For larger scaling factors, the instantaneous contrast is more important than intensity variation. Therefore, the system designer has a range of choices based on the scaling factor and the desired level of variation and instantaneous contrast. The functions EW1 and EW2 are two examples from this class that might be used in a system. However, more generally, the functions might be used in their general parameterized form.

B. An Interpolated Image

FIG. 1 illustrates an image being interpolated by the present invention. The invention allows the artificial and natural image portions of the image to be discriminated so that different interpolation functions can be used to scale the different portions appropriately.

FIG. 1 illustrates an image being interpolated by the present invention comprising an input 100, an input row 100, a letter G 112A, grayscale photograph 114A, a scaled letter G 112B, a scaled grayscale photograph 114B, an output 150, and an output row 160.

The input 100 includes the input row 110. The output 150 includes the output row 160. The input 100 is comprised of two distinct images, the letter G 112A and the grayscale photograph 114A. The output 150 is comprised of two distinct images, the scaled letter G 112B and the scaled grayscale photograph 114B.

The input 100 is a digital image. Digital images are comprised of pixels. The pixels of the digital image are arranged in a matrix with columns and rows. The location of a pixel p can be designated by its column and row: p(m,n). The pixel p(m,n) is in column m and row n.

The input row 110 is a row of pixels in the input 100. Many computer graphics algorithms operate in row order because memory devices are typically designed to be read and written in row order. In one embodiment, the invention works on rows of pixels. In another embodiment, the invention works on both rows and columns of pixels. In this example, the row based operation of the invention will be considered. The designation p(m) can be used to designate the $m^{th}$ pixel in the current row.

The output 150 is a digital image. The output 150 will contain more or fewer pixels then the input 100 depending on the scale factor. In this example, the scale factor is 2.0 in the horizontal direction and 1.0 in the vertical direction. That means that the output 150 has twice as many pixels in the horizontal direction as the input 100 and an equal number of pixels in the vertical direction as the input 100. If the scale factor had been 0.5 in the horizontal direction, the output 150 would have had half as many pixels in the horizontal direction as the input 100.

The output row 160 is the row of pixels in the output 150 that corresponds to the input row 110 after it has been scaled by the scale factor. Because the scale factor was 2.0 in the horizontal direction, the output row 160 has twice as many pixels as the input row 110. The pixels that were added to the output row 160 have been interpolated based on the contents of the input row 110. Table 1 demonstrates that the output row 160 is composed of two types of pixels, those from the input row 110 and those that have been interpolated in.

TABLE 1

··· ● ○ ● ○ ● ○ ● ○ ● ○ ● ···

The pixels that were part of the input row 110 are solid circles in Table 1 and the pixels that needed to be interpolated in to scale the image are shown as hollow circles in Table 1.

Different interpolation functions take different approaches to compute pixel values for the added pixels, the hollow circles, in the output row 160. Better interpolation functions will produce results that will fill in pixel values for the output row 160 so that that the output 150 is of a higher quality.

In the case of decimation, scale factors less than 1.0, pixels must be removed. The output row 160 would be comprised of fewer pixels than the input row 110 and thus all of the pixel values must be computed.

The input 100 contains two different image types, the left hand side of the image is the letter G 112A and the right hand side of the image is the grayscale photograph 114A. The letter G 112A is an artificial image while the grayscale photograph 114A is a natural image. When scaling the letter G 112A, the sharp pixel value discontinuity between the black pixels that comprise the letter G 112A and the surrounding white background should be preserved. If the edge of the letter G 112A is allowed to blur, it will be hard to discriminate its shape. The grayscale photograph 114A, in contrast, has continuous pixel values and when scaling it, the creation of sharp discontinuous edges, or aliasing the photograph, should be avoided. If aliasing occurs, the false edges introduced into the grayscale photograph 114A by the interpolation process will make it uncomfortable to view the image.

The input 100 has the artificial image and natural image portions separated by a large number of pixels, however it is possible for the two type of images to overlap or be positioned very closely in the input 100. Therefore it is desirable to adopt an image type determination scheme that works in a highly localized fashion.

C. Image Scaler with Pixel Type Determiner

Figure 2:
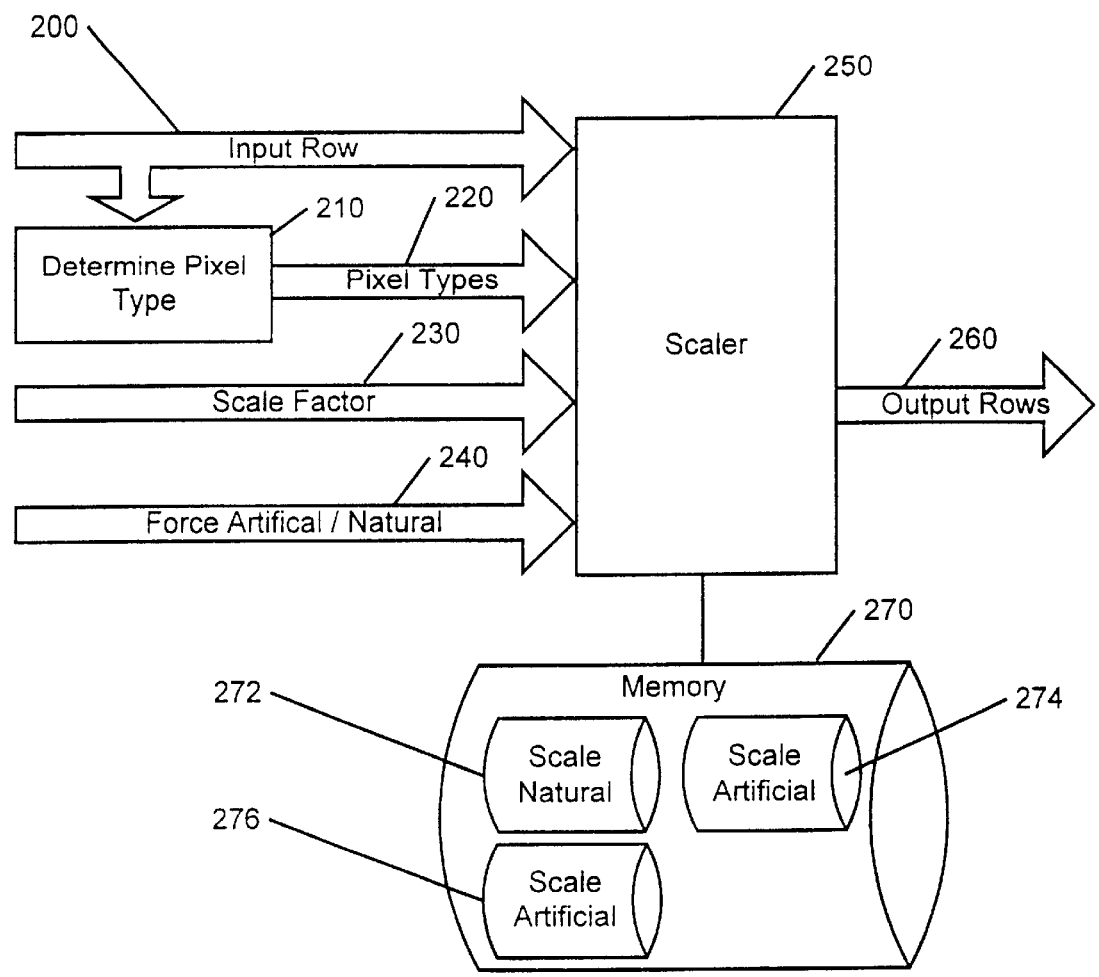
FIG. 2 is a hardware block diagram of an image scaler that dynamically selects scaling functions based on pixel type.

FIG. 2 is a hardware block diagram of an image scaler that dynamically selects scaling functions based on pixel type.

FIG. 2 includes a pixel type determiner 210, a scaler 250, and a memory 270. The pixel type determiner 210 outputs the pixel type of a pixel to the scaler 250 so that an appropriate interpolation function from the memory 270 can be chosen to scale the pixel.

The pixel type determiner 210 receives as inputs the input row 200. The input row 200 is a collection of pixel values. The input row 200 could be the input row 110 or any other row of pixels. The pixel values can be stored as single bytes, with each byte representing the grayscale intensity of the pixel from 0 to 255. In other embodiments, the pixel values might be several bytes comprising all of the color values for the pixel. The pixel type determiner 210 examines the input row 200 and determines a pixel type for the pixels in the input row 200. The pixel type determiner 210 outputs the pixel types 220. The pixel types 220 is a row of values corresponding to the pixels in the input row 200. Each value in the pixel types 220 row indicates either artificial or natural. In one embodiment, a 1 is used to represent artificial image pixels and a 0 to represent natural image pixels. The type of a pixel $p(m,n)$ may be designated $e(m,n)$. Since n is fixed in the input row 200, the pixel types 220 is a row of $e(m)$ values for the pixels $p(m)$ in row n.

The scaler 250 receives as inputs the input row 200, the pixel types 220, the scale factor 230, and the force mode 240. The scale factor 230 is a positive real number representing the degree to which the input row should be scaled horizontally. When the scale factor 230 is less than one, the input row 200 is decimated. When the scale factor 230 is greater than or equal to one, the input row 200 is interpolated. It is possible to scale the image both horizontally and vertically using this technique, but the scaler 250 only accomplishes horizontal scaling. The force mode 240 input allows the user to override the pixel type determiner 210 by indicating whether the image is artificial or natural. The force mode 240 could either be a single value that overrides the pixel type determiner 210 for a whole row, or it could be provided on a pixel by pixel basis. In this example, the force mode 240 is provided on an image by image basis and can have three values: ignore, force natural, and force artificial. For the remainder of this example, it will be assumed that the force mode 240 is set to ignore.

Because only a horizontal scale factor is being considered, each input row will produce only a single output row. More generally, the scaler 250 might need to access the entire image to properly interpolate, or decimate, it in both the horizontal and vertical directions. Similarly, more generally, the output from the scaler 250 might be an output image rather than the output row 260.

The scaler 250 produces the output row 260. In producing the output row 260, the scaler 250 uses the pixel types 220 for each pixel to select a scaling function from the memory 270 to apply to that pixel of the input row 200. Because the pixel type determiner 210 has determined the pixel types 220, the selected interpolation function is appropriate for the image type, either artificial or natural images, of each pixel in the input row 200.

The memory 270 might contain any number of interpolation functions. Each interpolation function stored in the memory should be tagged to indicate if it is more suitable for artificial or natural images. The interpolation functions stored in the memory might be parameterized interpolation functions such as the linear interpolation of Equation 1 using the parameterization of the linear coefficients by $\lambda$ as shown by Equation 4. The scaler 250 can then select any interpolation function from memory that is tagged as being appropriate for the current pixel's type. In this example, there are two functions for scaling artificial images, the scale artificial function 274 and the scale artificial function 276. Thus if the pixel type of the current pixel is an artificial image pixel, either scale artificial function 274 or scale artificial function 276 can be used.

In this example, the scaler 250 examines the pixel types 220 to determine the pixel type for each pixel of the input row 200. For example, the input row 200 might have a pixel $p(a)$ with a pixel type $e(a)=1$, or artificial image pixel, while another pixel in the input row 200, $p(b)$, might have a pixel type $e(b)=0$, or natural image. When the scaler 250 is interpolating the pixel p(m) by the scale factor 230, it uses the value of e(m) to select a scaling function. In this example, e(b) is 0, or natural image, so the scale natural function 272 can be used to interpolate pixel p(b). Similarly, e(a) is 1, or artificial image, so the scale artificial function 274 or the scale artificial function 276 can be used to interpolate pixel p(a).

It is possible for each interpolation function to have additional information stored with it to further refine the selection process. For example, scale artificial function 274 might indicate that it is only for scale factors less than a certain amount. In this example, the scale natural function 272 is the bilinear interpolation; the scale artificial function 274 is the EW1 interpolation; and the scale artificial function 276 is the EW2 interpolation. The EW1 interpolation works best for certain scale factors while the EW2 algorithm works best for others. Therefore, the scaler 250 can select the scale artificial function 274, a smoother interpolation function EW2, when the scale factor is less than a threshold scaling factor. A typical threshold scaling factor would be in the range of 2.0 to 4.0. The scale artificial function 276, a sharper interpolation function EW1, for scale factors larger than the threshold.

D. Pixel Type Determiner Detail

Figure 3:
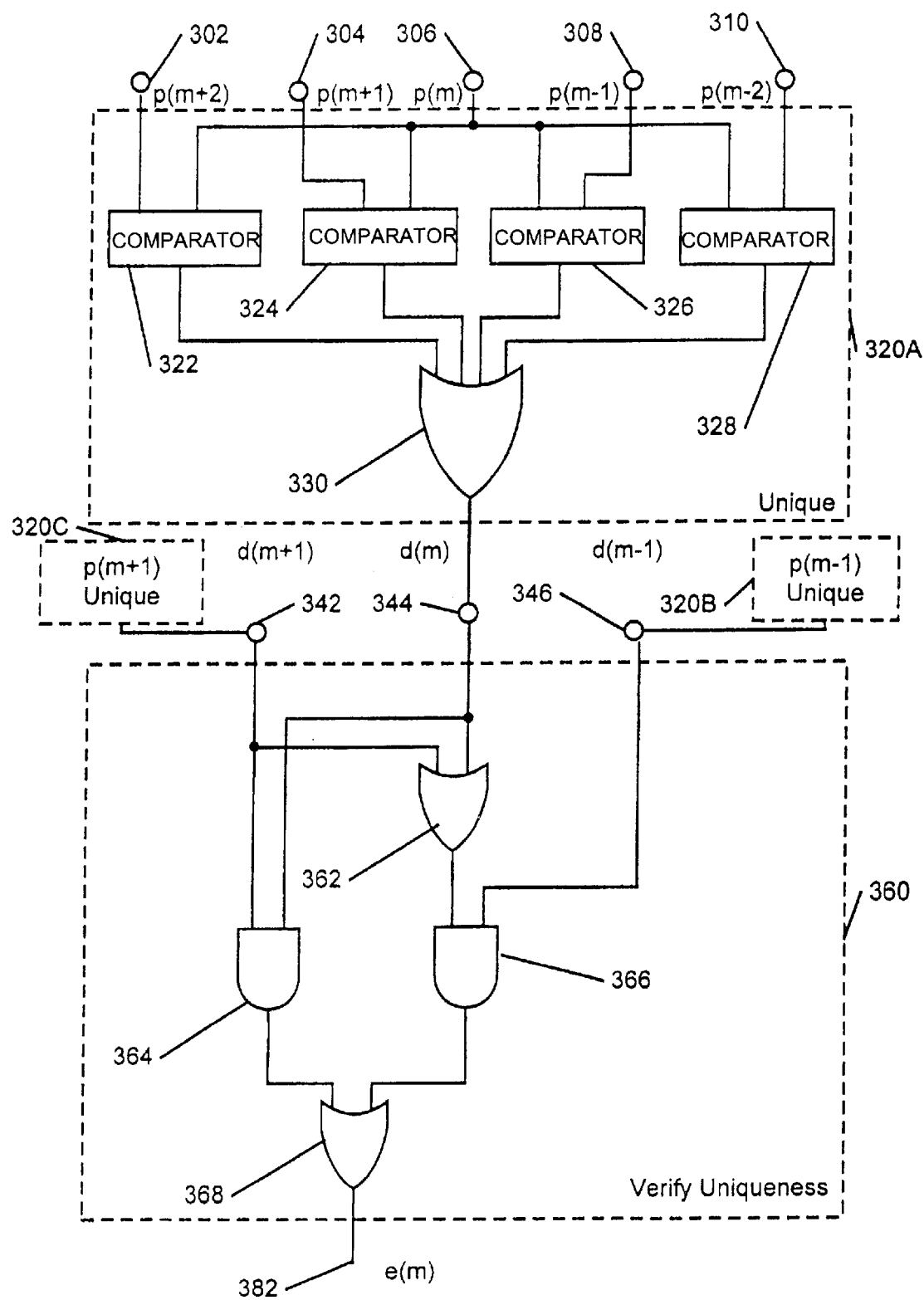
FIG. 3 is a logic diagram of a pixel type determiner.

FIG. 3 is a logic diagram of a pixel type determiner. This could be used as the pixel type determiner 210 in FIG. 2.

FIG. 3 includes unique logic blocks 320A–C and verify uniqueness logic block 360. The unique logic blocks 320A–C analyze whether a pixel is distinct, or unique, from its neighbors. The verify uniqueness logic block 360 refines the initial determination of uniqueness based on information gathered as to whether the surrounding pixels are also unique.

The unique logic block 320A accepts as inputs a first pixel 302, a second pixel 304, a target pixel 306, a third pixel 308, and a fourth pixel 310. The output of the unique logic block 320A is a 1 if the target pixel 306 is the same as any of its neighboring pixels, the first pixel 302, the second pixel 304, the third pixel 308, and the fourth pixel 310, and a 0 when the target pixel 306 is unique. The output of the unique logic block 320A is the preliminary pixel type determination 344, or d(m).

The input pixels to the unique logic block 320A are a portion of a row of pixels such as the input row 110 (see FIG. 1). The inputs surround the target pixel 306 in the input row 110. The correspondence between the inputs and the positions of the pixels in the row is best seen in Table 2.

TABLE 2

| | | | | | | |
|---|---|---|---|---|---|---|
| ... | ○ | ○ | ● | ○ | ○ | ... |
| | p(m − 2) | p(m − 1) | p(m) | p(m + 1) | p(m + 2) | |

The pixels to the right of p(m), the target pixel 306, have yet to be processed to determine their pixel types and the pixels to the left of p(m) have already had their pixel types determined. Thus, the pixel type determination is proceeding from the left edge of the image in a single row across to the right edge of the image.

The first pixel 302, the second pixel 304, the third pixel 308, and the fourth pixel 310 are coupled to the comparators 322–328 respectively. The target pixel is coupled to the comparators 322–328. The comparators 322–328 output a 1 when the two pixels are identical and a 0 otherwise. The outputs of the comparators 322–328 are coupled to an OR gate 330. The output of the OR gate 330 is the preliminary target determination 344 and is a 1 if at least one of the comparators 322–328 outputs a 1 and a 0 otherwise.

The unique logic blocks 320B–C can be comprised in the same fashion as the unique logic block 320A. Alternatively, delay circuits can be used to store the results of d(m−1) and d(m) until d(m+1) is computed. The unique logic block 320B produces the first determination 342, or d(m−1). The unique logic block 320C produces the second determination 346, or d(m+1). The correspondence between the preliminary pixel type determinations and the positions of pixels in the row is shown by Table 3.

TABLE 3

| | | | | |
|---|---|---|---|---|
| ○ | ○ | ● | ○ | ○ |
| ... p(m − 2) | p(m − 1) | p(m) | p(m + 1) | p(m + 2) ... |
| | d(m − 1) | d(m) | d(m + 1) | |

Once the outputs of unique logic blocks 320A–C are computed, the verify uniqueness logic block 360 can determine the type of the target pixel 306.

The verify uniqueness logic block 360 accepts as inputs the target determination 344 for the target pixel 306, the first determination 342, and the second determination 346. The verify uniqueness logic block 360 identifies the pixel type of the target pixel 306. Equation 7 is a mathematical formula for computing the target pixel type 382 from the inputs.

$$e_H(m) = \begin{cases} d(m-1) & \text{if } d(m-1) \oplus d(m+1) = 0 \\ d(m) & \text{otherwise} \end{cases} \quad (7)$$

This can be computed by coupling the target determination 344 and the first determination 342 to an OR gate 362 and to an AND gate 364. The second determination 346 and the output of the OR gate 362 are coupled to an AND gate 366. The outputs of the AND gates 364–366 are coupled to an OR gate 368. The output of the OR gate 368 is the target pixel type 382. The target pixel type 382 is 1 when the target pixel 306 is an artificial image pixel and a 0 for a natural image pixel.

In another embodiment, d(m+1), or the first determination 342, is used as the target pixel type 382, $e_H(m)$, when the exclusive-or of the second determination 346 and the first determination 342 is 0.

E. Detailed Example

FIG. 4 illustrates a source image similar to that shown in FIG. 1. FIGS. 5A–E show different stages of processing a row of data from the source image in FIG. 4 using the logic circuits of FIG. 3.

FIG. 4 contains a source image 400, a detail row 402, an artificial image target pixel 410, a natural image target pixel 412, and a third target pixel 414.

The source image 400 is a digital image and is comprised of pixels arranged in a matrix of columns and rows. The detail row 402 is a row of pixels in the source image 400. The artificial image target pixel 410 is a pixel in the detail row 402 that is at the left edge of the letter 'G' in the detail row 402. The natural image target pixel 412 is in the grayscale photograph of the woman in the detail row 402. The third target pixel 414 is the single black pixel of the single-pixel wide line in the source image 400 where the single-pixel wide line crosses the detail row 402. In this example, each pixel has a grayscale intensity value from 0, black, to 7, white.

FIG. 5A shows a detailed view of the inputs to the pixel type determiner 210 as implemented by FIG. 3. The inputs, p(m−2) to p(m+2), to the unique logic block 320A are shown for three different target pixels surrounded by parenthesis, '( )'. Additional pixel values needed to fully compute the pixel type are surrounded by braces, '{ }'. The target pixel type 382, $e_H(m)$, depends on the three pixels to the left and the three pixels to the right of the target pixel. The detailed view 502 shows the pixel value inputs for artificial image target pixel 410. The detailed view 504 shows the pixel value inputs for the natural image target pixel 412. The detailed view 506 shows the pixel value inputs for the third target pixel 414.

As the detail row 402 is processed, the inputs shown in FIG. 5A are provided to FIG. 5B. FIG. 5B includes the unique logic block 320A. The entire row is processed by the unique logic block 320A (see FIG. 3) to compute the preliminary pixel type determinations for the detail row 402 as shown in FIG. 5C.

FIG. 5C shows a detailed view of the preliminary pixel types, d(m), for the pixels of the detail row 402. The detailed view 508 shows the preliminary determination for the artificial image target pixel 410 and the preliminary determinations for the nearest neighbors. The detailed view 510 shows the preliminary determination for the natural image target pixel 412 and the preliminary determinations for the nearest neighbors. The detailed view 512 shows the preliminary determination for the third target pixel 414 and the preliminary determinations for the nearest neighbors.

The preliminary determinations from FIG. 5C are provided to FIG. 5D. FIG. 5D includes the verify uniqueness logic block 360 (See FIG. 3). The result, the target pixel type 382 is shown in FIG. 5E.

In FIG. 5E, the target pixel type 382 is shown for three different target pixels. The detail view 514 shows the pixel type for artificial image target pixel 410. The detail view 516 shows the pixel type for natural image target pixel 412. The detail view 518 shows the pixel type for the third target pixel 414.

1. Artificial Image Target Pixel

The artificial image target pixel 410 is the last white pixel before the edge of the letter 'G' in the detail row 402. In detail view 502 of FIG. 5A, the surrounding pixel values are shown. The black pixels that make up the 'G' are 0's while the white background pixels are 7's.

At the unique logic block 320A of FIG. 5B, the comparisons on the target pixel with the four surrounding pixels will result in a 1, or artificial image, as a preliminary determination.

In more detail, artificial image target pixel 410 is the target pixel 306. The two pixels with pixel values of 7 to the left of the text target pixel 410 are the third pixel 308 and the fourth pixel 310. The two pixels with pixel values of 0 to the right of the text target pixel 410 are the first pixel 302 and the second pixel 304.

In FIG. 5B, the inputs are processed in the preliminary pixel type determination block 320A. The comparators 322–328 compare each of the surrounding pixels with the target pixel 306. Here, the text target pixel 410 is the target pixel 306 and is compared with the first pixel 302, resulting in a 0, not equal. The target pixel 306 is compared with the second pixel 304, resulting in a 0, not equal. The target pixel 306 is compared with the third pixel 308, resulting in a 1, equal. The target pixel 306 is compared with the fourth pixel 310, resulting in a 1, equal. These results are OR'ed together resulting in a 1 as the target determination 344 for the artificial image target pixel 410. This is shown in FIG. 5C which includes the preliminary pixel type determination 344 for the artificial image target pixel 410 in detailed view 508.

Because the preliminary pixel types for the two surrounding pixels are necessary to compute the target pixel type 382 of the text target pixel 410, they have been computed in the same fashion as shown above by the unique logic block 320A.

The preliminary pixel type determinations shown in detail view 508 are then used to compute the final pixel type for the artificial image target pixel 410. The preliminary pixel types are provided to FIG. 5D where the verify uniqueness logic block 360 computes the final pixel type.

In FIG. 5D, the target determination 344 used by the verify uniqueness logic block 560 is the value computed in FIG. 5B and shown in FIG. 5C. The first determination 342 and the second determination 346 are shown in FIG. 5C as well. Here, the first determination 342 of 1 is AND'ed with the target determination 344 of 1 by the AND gate 364 to compute 1. The OR of those two values is also 1 and that is the result of the OR gate 362. The result of the OR gate 362 is AND'ed with the second determination 346 of 1 by the AND gate 366 to compute 1. The result of the AND gate 364 and the result of the AND gate 366 are OR'ed together to produce the target pixel type 382 of 1 by the OR gate 368.

In FIG. 5E, the pixel type of the artificial image target pixel 410 is shown. In detail view 514, the type of the artificial image target pixel 410 is shown to be 1, or an artificial image pixel.

2. Natural Image Target Pixel

The processing of the natural image target pixel 412 proceeds much like the previous case. The input pixels of the natural image portion of the detail row surrounding the natural image target pixel 412 have a variety of different values. The detail view 504 shows the different pixel values surrounding the natural image target pixel 412.

The resulting uniqueness determinations are shown in the detail view 510. The natural image target pixel 412 has a preliminary determination of 0, or natural image pixel. That determination is refined to reveal the pixel type of that the natural image target pixel 412 is 0, or natural image, in detail view 516.

3. Third Target Pixel

The processing of the third target pixel 414 proceeds much like the previous cases. Because third target pixel 414 is a singular point of discontinuity from the surrounding pixels, the target determination from unique logic block 320A is that the third target pixel 414 is a natural image pixel, 0. However, the detail view 512 reveals, the surrounding pixels were typed as artificial image pixels at the preliminary determination stage.

If the third target pixel 414 is treated as a natural image pixel, it would produce an interpolated image that allowed the hard edges of the line to blur because it was mistakenly identified as a natural image pixel. The verify uniqueness logic block 360 serves the important purpose of ensuring that a determination that a pixel is unique, d(m)=0, is supported by the determinations of the adjacent pixels.

Here, even though the preliminary determination for the third target pixel 414 was 0, the exclusive-or of the surrounding preliminary determinations was 0so instead of using the current preliminary determination, the preliminary determination of the last pixel that was processed which here was a 1, or an artificial image pixel, is used. Thus, the third target pixel is correctly identified as an artificial image pixel and the line is preserved.

F. Process Description

Figure 6:
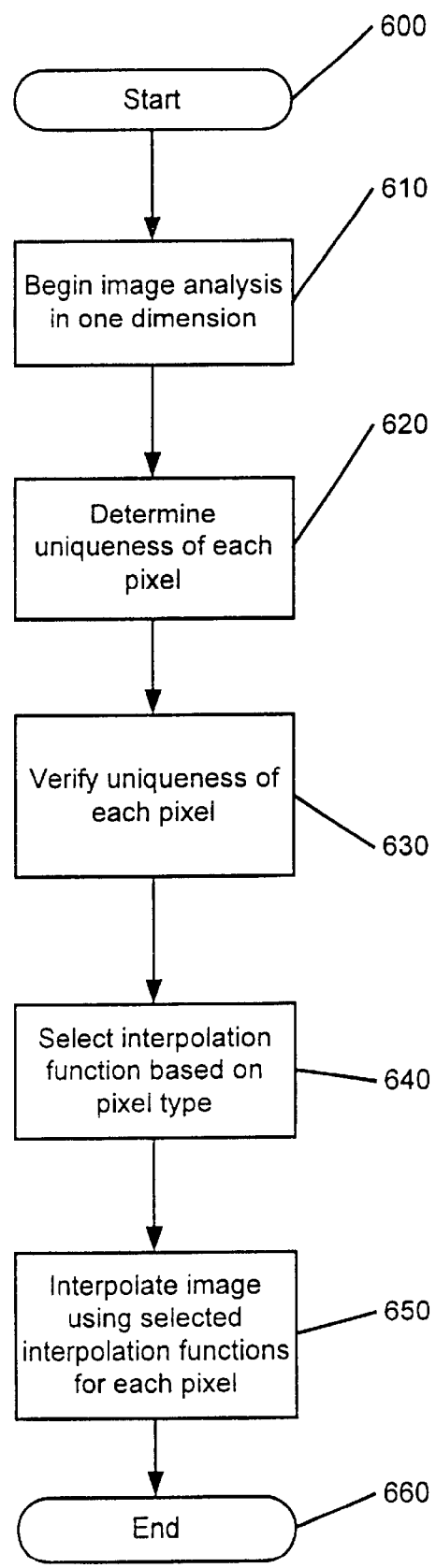
FIG. 6 is a process flow diagram illustrating a method of selecting interpolation functions based on image type on a pixel by pixel basis.

FIG. 6 is a process flow diagram illustrating a method of selecting interpolation functions based on image type on a pixel by pixel basis.

At the start block 600, a source image is provided along with a scale factor. The source image could be the input 100 (see FIG. 1 or any other digital image. The scale factor is given as a real number that represents the amount of horizontal scaling to be applied.

Control is then passed to process block 610 where the image analysis begins in a row by row fashion. Each row can be analyzed pixel by pixel using a pixel type determiner. This can be done by using the logic circuits of FIG. 3.

Control is then passed to process block 620 where the uniqueness of each pixel is determined using the unique logic block 320A (see FIG. 3). Process block 620 outputs a row of bits with the uniqueness determinations. The bit, d(m), is 0 if the pixel, p(m), is unique, e.g. surrounded by two pixels to the left and two pixels to the right that have different pixel values. The bit, d(m), is 1 for the pixel, p(m), otherwise. This process is repeated for all of the rows of the image. Alternatively, Equation 8 can be used to determine uniqueness.

$$d(m) = \begin{cases} 1 & \text{if } \min\{|p(m) - p(m+k)| : k \in \{-2, -1, 1, 2\}\} \\ 0 & \text{otherwise} \end{cases} \quad (8)$$

Control is then passed to process block 630 where the uniqueness of each pixel is verified using the verify uniqueness logic block 360 (see FIG. 3). This process refines the initial judgment that a pixel was unique by looking at the uniqueness determinations for the surrounding pixels in the row. The result is a row bits of pixel type determinations, $e_H(m)$, for each pixel, p(m), in the row. The bit, $e_H(m)$, is 1 if the pixel, p(m), is an artificial pixel and 0 if the pixel, p(m), is a natural pixel. Alternatively, Equation 7 can be used to compute the values of $e_H(m)$. This process is repeated for all of the rows of the image.

Control is then passed to process block 640 where an interpolation function is chosen for each pixel based on the pixel type. There are a number of interpolation functions that can be used to scale images. The interpolation functions can be stored along with a tag indicating whether the function is best for scaling artificial images or natural images. The memory 270 (see FIG. 2) includes three interpolation functions that are tagged to indicate the type of image they work best on. For each pixel, an interpolation function is chosen with a tag that matches the $e_H(m)$ determination. Thus for a pixel p(a) with $e_H(a)=1$, or artificial image pixel, either the scale artificial function 274 or the scale artificial function 276 will be chosen (see FIG. 2). Similarly, for a pixel p(b) with $e_H(b)=0$, or natural image pixel, the scale natural function 272 will be chosen (see FIG. 2). In some embodiments, the scale factor can be used to select among the different interpolation functions that have matching tags. For example, the scale artificial function 274 could be used for scale factors less than a certain threshold scaling factor, and the scale artificial function 276 could be used for scale factors greater than the threshold scaling factor.

Control then passes to process block 650 where the image is interpolated using the selected interpolation functions. The interpolation of the image proceeds by using the interpolation function identified by process block 640 for each pixel of the image. This ensures that the interpolation function being used for a particular pixel is suitable for the pixel type, artificial or natural, and that the undesirable interpolation artifacts of blurring and aliasing will be minimized. For artificial image pixels, blurring will be minimized because the interpolation functions chosen by process block 640 are suitable for artificial images, e.g. edge preserving. Similarly, for natural image pixels, aliasing will be minimized because the selected interpolation functions are suitable for natural images.

The process ends at end block 660 with the scaled output image.

G. Handling Color Pixels

Figure 7:
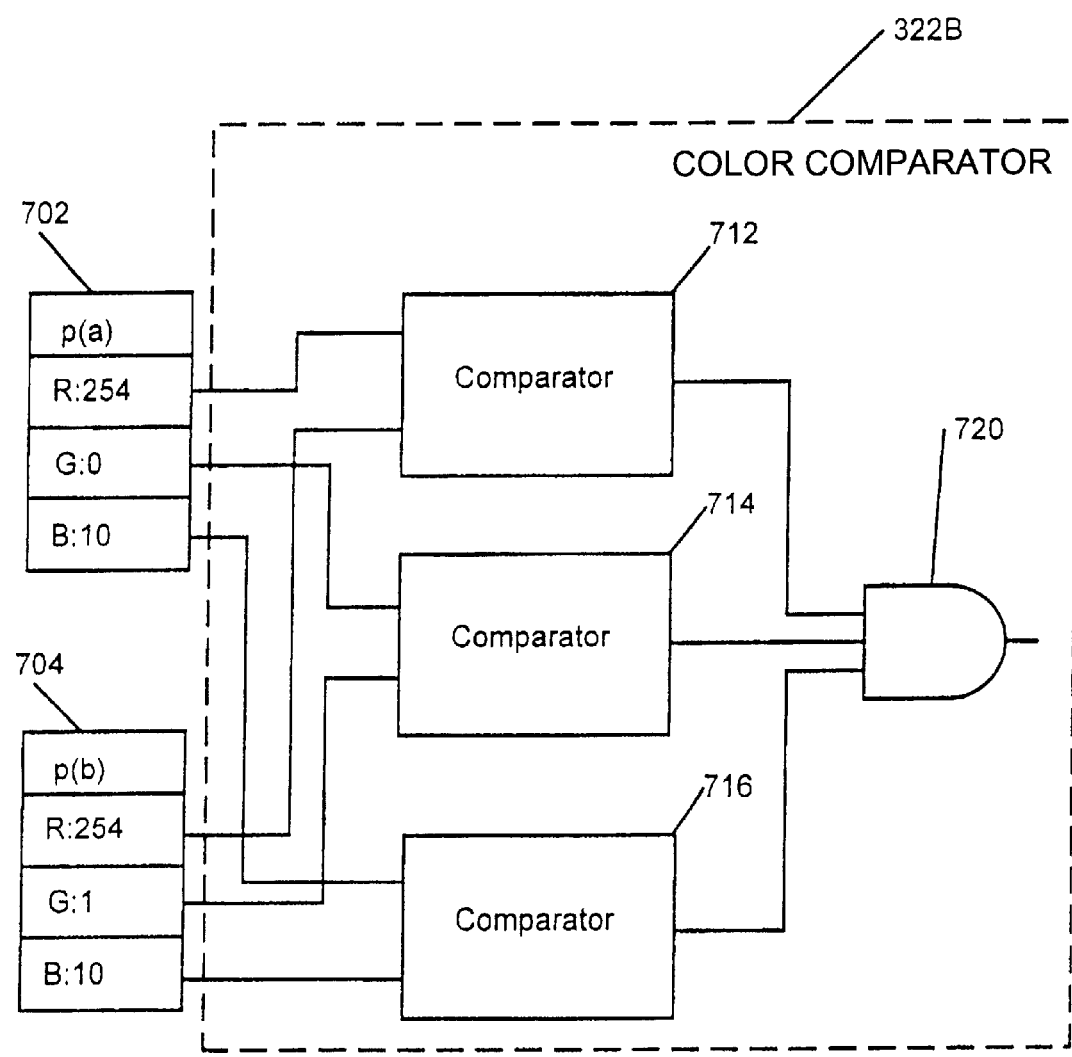
FIG. 7 is a logic diagram of a color pixel comparator.

FIG. 7 is a logic diagram of a color pixel comparator. The color pixel comparator could be used as the comparators 322–328 of the unique logic block 320A of FIG. 3.

FIG. 7 comprises the comparator 322B, a pixel 702 and a pixel 704, a comparator 712, a comparator 714, a comparator 716, and an AND gate 720. The comparator 322B comprises the comparators 712–716 and the AND gate 720.

The color components of the pixel 702 and the color components of the pixel 704 are compared against each other by the comparators 712–716. The comparators 712–716 output a 1 when the two input color components are the same and 0 otherwise. The results of the comparators 712–716 are coupled to the AND gate 720. The AND gate 720 outputs a 1 if all of the color components are identical and a 0 otherwise.

Pixels in computer images are typically comprised of three color components, a red component, a green component and a blue component. The pixel 702 and the pixel 704 each have a red, a green, and a blue color component. Alternatively, these color components can be expressed in other systems such as hue, saturation, and lightness.

Here, it is notable that pixel 702 and pixel 704 are different because the color components are not all identical, the green component of pixel 702 is 0 while the green component of pixel 704 is 1. Thus, the output from the comparator 714 will be 0, and the AND gate 720 will output a 0.

The comparator 322B can be use in place of the comparators 322–328 in the unique logic block 320A of FIG. 3 to enable color pixels to have their pixel types determined.

H. Optimized Pixel Type Determiner

Figure 8:
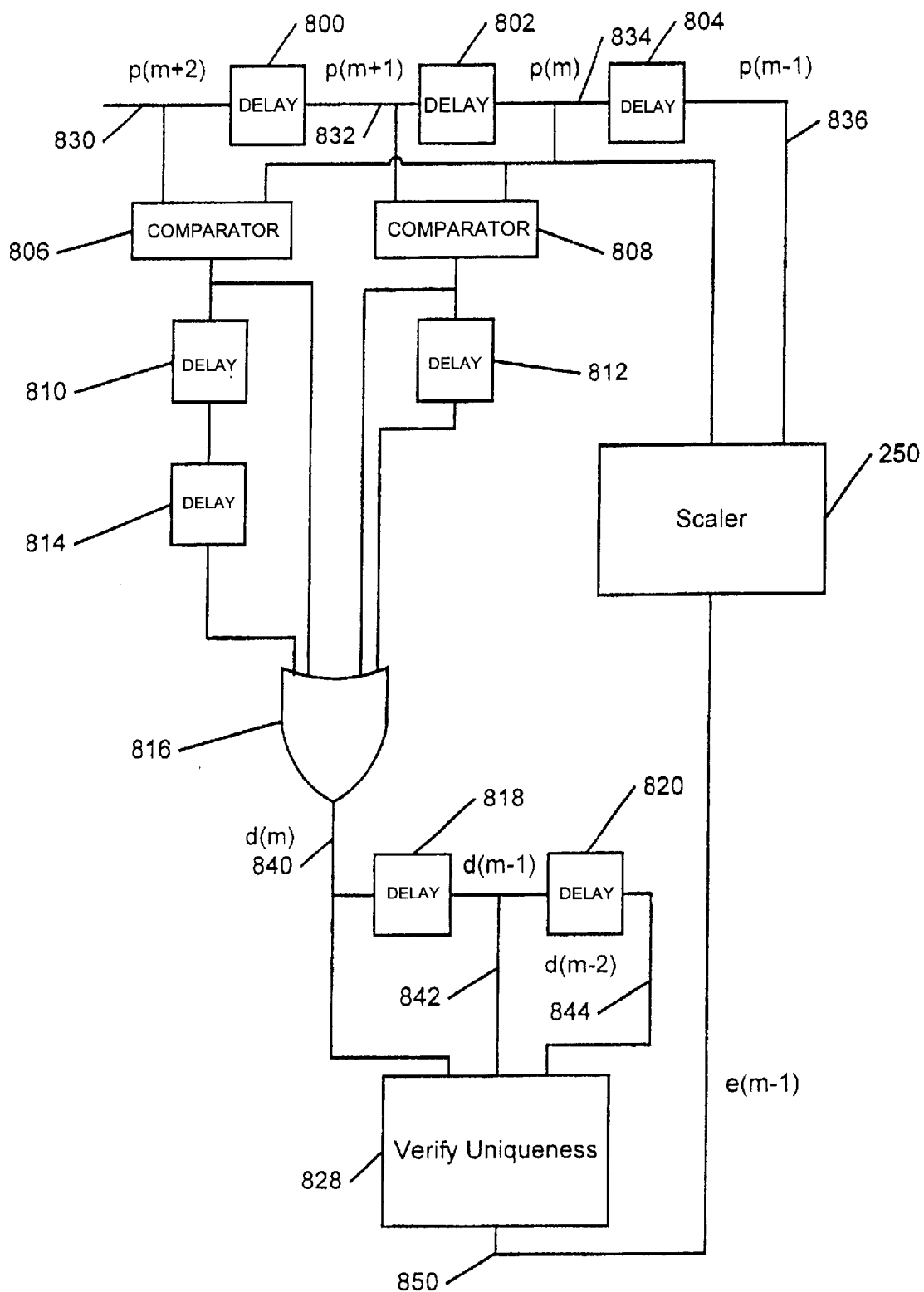
FIG. 8 is a logic diagram of an optimized pixel type determiner.

FIG. 8 is a logic diagram of a pixel type determiner. The logic setup is similar to that of the pixel type determiner of FIG. 3; however, the pixel type determiner of FIG. 8 has been optimized to reduce the amount of circuitry required for delay elements and comparators.

The pixels flow into the pixel type determiner at the upper left of FIG. 8 one at a time. As an input pixel 830 flows into the logic circuit, the input pixel 830 flows into a delay 800 and a comparator 806. The input pixel 830 is p(m+2). The delays 800–804 are setup so that the pixel p(m−1) is fed as the input to the scaler 250 at the same time that the pixel type determination e(m−1) reaches the scaler 250. The delay 800 produces the first output pixel 832, p(m+1). The first output pixel 832 flows into the delay 802. The delay 802 produces the second output pixel 834, p(m). The second output pixel 834 flows into the delay 804. The delay 804 produces the third output pixel 836, p(m−1), and provides the third output pixel to the scaler 250.

Because the optimized pixel determiner operates like a pipeline, the functionality of the four comparators used in the pixel determiner of FIG. 3 can be replaced by two comparators coupled to delay elements. The inputs to the comparator 806 are coupled to the input pixel 830 and the second output pixel 834. The output of the comparator 806 flows into the one bit delay 810 and an OR gate 816. The output of the one bit delay 810 is coupled to a one bit delay 814. The output of the one bit delay 814 is coupled to the OR gate 816. The inputs to a comparator 808 are coupled to the first output pixel 832 and the second output pixel 834. The output of the comparator 808 flows into a one bit delay 812 and the OR gate 816. The output of the one bit delay 812 flows into the OR gate 816. The comparators 806–808 output a 1 if the two inputs are identical and a zero otherwise.

The OR gate 816 computes the functionally equivalent result as the OR gate 330 (see FIG. 3). The organization of the comparators 806–808 with the one bit delays 810–814 reduced the number of comparators and facilitated a pipeline organization to the pixel type determiner. The output of the OR gate 816 is a first preliminary type determination 840, d(m).

The first preliminary type termination 840 is the input to a one bit delay 818. The output of the one bit delay 818 is a second preliminary type determination 842, d(m−1). The second preliminary type determination is the input to a one bit delay 820. The output of the one bit delay 820 is a third preliminary type determination 844, d(m−2).

The preliminary type determinations 840–844 can be provided to the verify uniqueness logic block 360 (see FIG. 3) to compute a pixel type determination 850, e(m−1), for the third output pixel 836, p(m−1). The pixel type determination 850 is provided to the scaler 250.

I. Working in Two-Dimensions

The discussion so far has primarily focused on a one dimensional approach to pixel type determination. However, the invention is easily extended to two dimensions in several different ways.

In one embodiment, after performing the pixel type determination process on rows to compute $e_H(m,n)$, the process is repeated on the columns to compute $e_V(m,n)$. The two results are then OR'ed together to compute the final pixel type determination: $e(m,n) = e_H(m,n)$ OR $e_V(m,n)$. Then, $e(m,n)$ is used to select an interpolation function. When $e(m,n)=1$, or artificial, an interpolation function suitable for that type of pixel is then chosen, otherwise an interpolation function suitable for natural pixels is chosen.

In another embodiment, different interpolation functions can be used in the horizontal and vertical directions. Here, $e_H(m,n)$ is used to select the horizontal interpolation function for pixel p(m,n) and $e_V(m,n)$ is used to select the vertical interpolation function for the pixel.

In yet another embodiment, no vertical pass is made at all and $e(m,n)=e_H(m,n)$. That is to say, the horizontal pixel type determination is used to select the interpolation function for the pixel without the addition of a vertical pass. This still produces high quality results without the added computation and hardware necessary for the two pass embodiments discussed above.

J. Selecting an Interpolation Function when Adjacent Pixel Types are Mismatched

Because at least two pixels are needed to interpolate any pixel in between the two source pixels for interpolation in one dimension, it will be a problem if the adjacent pixel types are different at the two source pixel positions. Consider the following horizontal interpolation as shown by Table 4.

TABLE 4

| ... Artificial Pixel | Interpolated Pixel | Natural Pixel ... |
| --- | --- | --- |

Since the interpolated pixel is related to the adjacent source pixels with different types, there is a mismatch of types to address in selecting an interpolation function. When interpolation is done in two dimensions, four pixels will be used to interpolate a pixel between the source pixels as shown by Table 5.

TABLE 5

| . | Artificial Pixel | . |
| --- | --- | --- |
| . | . | . |
| Artificial Pixel | Interpolated Pixel | Natural Pixel |
| . | . | . |
| . | Artificial Pixel | . |

Therefore, a decision scheme is desirable to select the appropriate interpolation function when the adjacent pixel types are mismatched.

One approach is use an artificial image interpolation function if any one of the source pixels is detected to be an artificial image pixel. Another approach is to use a natural image interpolation function if any one of the pixels is detected to be a natural image pixel. A third approach is to adopt the interpolation function based on the predominant source pixel type. If more of the source pixels are of the artificial image pixel type, then the artificial image interpolation function is used. Otherwise, the natural image interpolation function is used. If the source pixels are evenly split between the two types, one of the other two approaches can be used.

K. Conclusion

Some embodiments of the invention are included in computer usable media such as CD-ROMs, or other computer usable media. The computer usable media can comprise the software for pixel type determiners, interpolation and scaling functions, and scaler programs.

Some embodiments of the invention are included in an electromagnetic wave form. The electromagnetic wave form comprises information such as software for pixel type determiners, interpolation and scaling functions, and scaler programs.

Thus, a method and apparatus for selecting interpolation functions based on image type on a pixel by pixel basis has been described. The method permits highly localized decisions to be made about image type. The method offers unique benefits for selecting the most appropriate type of interpolation function for each part of an image on a pixel by pixel basis.

What is claimed is:

1. A method of scaling a source image, said source image comprised of a first plurality of pixels, by a scale factor, said method for scaling comprising:

determining whether a target pixel in said plurality of pixels is in a natural image region or an artificial image region, wherein said target pixel is determined to be in a natural image region if no pixels in a neighborhood of said target pixel have a value matching said target pixel, and is determined to be in an artificial image region otherwise;

scaling said source image at said target pixel using a first interpolation function if said target pixel is in the natural image region; and scaling said source image at said target pixel using a second interpolation function if said target pixel is in the artificial image region, wherein the second interpolation function is different than said first interpolation function.

2. A method of scaling a source image, said source image comprised of a first plurality of pixels, by a scale factor, said method for scaling comprising:

determining a first type of a target pixel, said target pixel in said plurality of pixels;

selecting a first interpolation function for said target pixel from said first type of said target pixel; and scaling said source image using said first interpolation function for scaling said target pixel, wherein said determining further comprises:

examining a second plurality of pixels, said second plurality of pixels being a subset of said first plurality of pixels and said second plurality of pixels being near to said target pixel in said source image;

determining if said target pixel is similar to said second plurality of pixels; and identifying said first type responsive to said determining,
 a) said first type being said first pixel type when said target pixel is similar to said second plurality of pixels
 b) and said first type being said second pixel type when said target pixel is dissimilar to said second plurality of pixels.

3. The method of claim 2, wherein said identifying further comprises:

determining a second type for a second pixel, said second pixel in said second plurality of pixels and said second pixel being adjacent to said target pixel;

determining a third type for a third pixel, said third pixel in said third plurality of pixels and said third pixel being adjacent to said target pixel;

comparing said second type and said third type;

and identifying said first type responsive to said comparing,
 a) said first type being the pixel type of said second type when said second type is identical to said third type,
 b) said first type being said first pixel type when said second type is not identical to said third type and said target pixel is similar to said second plurality of pixels,
 c) and said first type being said second pixel type when said second type is not identical to said third type and said target pixel is dissimilar to said second plurality of pixels.

4. A method of scaling a source image, said source image comprised of a first plurality of pixels, by a scale factor, said method for scaling comprising:

determining a first type of a target pixel, said target pixel in said plurality of pixels;

selecting a first interpolation function for said target pixel from said first type of said target pixel; and scaling said source image using said first interpolation function for scaling said target pixel, wherein said determining further comprises:

identifying a second pixel and a third pixel, said second pixel and said third pixel being adjacent to said target pixel in said first plurality of pixels;

examining a second plurality of pixels, said second plurality of pixels being near to said second pixel in said source image;

examining a third plurality of pixels, said third plurality of pixels being near to said third pixel in said source image;

examining a fourth plurality of pixels, said fourth plurality of pixels being near to said fourth pixel in said source image;

determining if said second pixel is similar to said second plurality of pixels;

identifying a second type responsive to said determining,
 a) said second type being said first pixel type when said second pixel is similar to said second plurality of pixels
 b) and said second type being said second pixel type when said second pixel is dissimilar to said second plurality of pixels;

determining if said third pixel is similar to said third plurality of pixels;

identifying a third type responsive to said determining,
 a) said third type being said first pixel type when said third pixel is similar to said third plurality of pixels
 b) and said third type being said second pixel type when said third pixel is dissimilar to said third plurality of pixels;

determining if said target pixel is similar to said fourth plurality of pixels;

and identifying a type for said target pixel responsive to said determining, said second type and said third type,
 a) said first type being the pixel type of said second type when said second type is identical to said third type,
 b) said first type being said first pixel type when said second type is not identical to said third type and said target pixel is similar to said fourth plurality of pixels,
 c) and said first type being said second pixel type when said second type is not identical to said third type and said target pixel is dissimilar to said second plurality of pixels.

5. The method of claim 2, wherein said selecting further comprises:

selecting a first type of interpolation function when said first type is a first pixel type and selecting a second type of interpolation function when said first type is a second pixel type.

6. The method of claim 1, including selecting the first interpolation function from a plurality of interpolation functions including:

at least one of an interpolation function with a first type of edge weighting and an interpolation function with a second type of edge weighting.

7. The method of claim 2, wherein said selecting further comprises:

selecting a smoother interpolation function when said first type is a second pixel type.

8. The method of claim 7, wherein said selecting further comprises:

selecting a bilinear interpolation function.

9. The method of claim 1, wherein each pixel of said plurality of pixels is comprised of a plurality of data elements, said plurality of data elements comprising one or more of a red data element, a green data element, a blue data element, a hue data element, a saturation data element, a brightness data element, and a lightness data element.

10. The method of claim 1, wherein each pixel of said plurality of pixels is comprised of a plurality of data elements and said determining further comprises:

examining a second plurality of pixels, said second plurality of pixels being a subset of said first plurality of pixels and said second plurality of pixels being near to said target pixel in said source image.

11. An apparatus for scaling an image by a scale factor, said image comprised of pixels, and said apparatus comprising:

a local image analyzer for identifying from among said pixels a target pixel and a set of pixels proximate to said target pixel and determining whether said target pixel is in a natural image region or an artificial image region, wherein said target pixel is determined to be in a natural image region if no pixels in said set of pixels proximate to said target pixel have a value matching said target pixel, and is determined to be in an artificial image region otherwise;

a linear interpolation function that is parameterized by a horizontal linear interpolation coefficient and a vertical linear interpolation coefficient;

an interpolation coefficient generator for defining the horizontal linear interpolation coefficients and the vertical linear interpolation coefficients; and an image scaler for scaling said image in a neighborhood of the target pixel by the scale factor using the linear interpolation function with the horizontal linear interpolation coefficients and the vertical linear interpolation coefficients, when said target pixel is in the artificial image region, using a different interpolation function when said target pixel is in the natural image region.

12. An apparatus for scaling an image by a scale factor, said image comprised of pixels, and said apparatus comprising:

a local image analyzer for identifying from among said pixels a target pixel and a set of pixels proximate to said target pixel and determining a type for said target pixel;

a linear interpolation function that is parameterized by a horizontal linear interpolation coefficient and a vertical linear interpolation coefficient;

an interpolation coefficient generator for defining the horizontal linear interpolation coefficients and the vertical linear interpolation coefficients; and an image scaler for scaling said image in a neighborhood of the target pixel by the scale factor using the linear interpolation function with the horizontal linear interpolation coefficients and the vertical linear interpolation coefficients, wherein said local image analyzer includes:

a plurality of pixel comparators for comparing said target pixel with each pixel in said set of pixels proximate to said target pixel to produce a plurality of results, each result in said plurality of results being at least one of similar and different;

and a type determiner for identifying said type for said target pixel as
a) type I when at least one result in said plurality of results is similar
b) type II when no result in said plurality of results is similar.

13. The apparatus of claim 12, wherein the interpolation coefficient generator defines the horizontal linear interpolation coefficients and the vertical linear interpolation coefficients to make the linear interpolation a bilinear interpolation when the type of the target pixel is type II.

14. The apparatus of claim 12, wherein the interpolation coefficient generator defines the horizontal linear interpolation coefficients and the vertical linear interpolation coefficients to make the linear interpolation one of at least an interpolation function with a first type of edge weighting and an interpolation function with a second type of edge weighting.

15. An apparatus for scaling an image by a scale factor, said image comprised of pixels, and said apparatus comprising:

a local image analyzer for identifying from among said pixels a target pixel and a set of pixels proximate to said target pixel and determining a type for said target pixel;

a linear interpolation function that is parameterized by a horizontal linear interpolation coefficient and a vertical linear interpolation coefficient;

an interpolation coefficient generator for defining the horizontal linear interpolation coefficients and the vertical linear interpolation coefficients; and an image scaler for scaling said image in a neighborhood of the target pixel by the scale factor using the linear interpolation function with the horizontal linear interpolation coefficients and the vertical linear interpolation coefficients, wherein said interpolation function coefficient generator uses the scale factor and the type of the target pixel to define the horizontal linear interpolation coefficient and the vertical linear interpolation coefficient.

16. An apparatus for scaling an image by a scale factor, said image comprised of pixels, and said apparatus comprising:

a local image analyzer for identifying :from among said pixels a target pixel and a set of pixels proximate to said target pixel and determining a type for said target pixel;

a linear interpolation function that is parameterized by a horizontal linear interpolation coefficient and a vertical linear interpolation coefficient;

an interpolation coefficient generator for defining the horizontal linear interpolation coefficients and the vertical linear interpolation coefficients; and an image scaler for scaling said image in a neighborhood of the target pixel by the scale factor using the linear interpolation function with the horizontal linear interpolation coefficients and the vertical linear interpolation coefficients, wherein said interpolation function coefficient generator uses a preset variation level and the scale factor to define the horizontal linear interpolation coefficient.

17. An apparatus for scaling an image by a scale factor said image comprised of pixels, and said apparatus comprising:

a local image analyzer for identifying from among said pixels a target pixel and a set of pixels proximate to said target pixel and determining a type for said target pixel;

a linear interpolation function that is parameterized by a horizontal linear interpolation coefficient and a vertical linear interpolation coefficient;

an interpolation coefficient generator for defining the horizontal linear interpolation coefficients and the vertical linear interpolation coefficients; and an image scaler for scaling said image in a neighborhood of the target pixel by the scale factor using the linear interpolation function with the horizontal linear interpolation coefficients and the vertical linear interpolation coefficients, wherein said interpolation function coefficient generator uses a preset variation level and the scale factor to define the parameterization of the vertical linear interpolation coefficient.

18. An apparatus for scaling an image by a scale factor, said image comprised of pixels, and said apparatus comprising:

a local image analyzer for identifying from among said pixels a target pixel and a set of pixels proximate to said target pixel and determining a type for said target pixel;

a linear interpolation function that is parameterized by a horizontal linear interpolation coefficient and a vertical linear interpolation coefficient;

an interpolation coefficient generator for defining the horizontal linear interpolation coefficients and the vertical linear interpolation coefficients; and an image scaler for scaling said image in a neighborhood of the target pixel by the scale factor using the linear interpolation function with the horizontal linear interpolation coefficients and the vertical linear interpolation coefficients, wherein said interpolation function coefficient generator uses a set instantaneous contrast and the scale factor to define the parameterization of the horizontal linear interpolation coefficient.

19. An apparatus for scaling an image by a scale factor, said image comprised of pixels, and said apparatus comprising:

a local image analyzer for identifying from among said pixels a target pixel and a set of pixels proximate to said target pixel and determining a type for said target pixel;

a linear interpolation function that is parameterized by a horizontal linear interpolation coefficient and a vertical linear interpolation coefficient;

an interpolation coefficient generator for defining the horizontal linear interpolation coefficients and the vertical linear interpolation coefficients; and an image scaler for scaling said image in a neighborhood of the target pixel by the scale factor using the linear interpolation function with the horizontal linear interpolation coefficients and the vertical linear interpolation coefficients, wherein said interpolation function coefficient generator uses a set instantaneous contrast and the scale factor to define the parameterization of the vertical linear interpolation coefficient.

20. The method of claim 1, including storing a plurality of interpolation functions and a plurality of tags for corresponding interpolation functions in the plurality of interpolation functions in memory, the tags indicating whether the corresponding interpolation function is suitable for artificial images or natural images, and selecting the first interpolation function or the second interpolation function in response to the determining and to the tags.

* * * * *